L. V. ROSSER.
POISON DISTRIBUTING APPARATUS.
APPLICATION FILED OCT. 26, 1911.

1,021,707.

Patented Mar. 26, 1912.

UNITED STATES PATENT OFFICE.

LEVIN V. ROSSER, OF TUSCALOOSA, ALABAMA.

POISON-DISTRIBUTING APPARATUS.

1,021,707. Specification of Letters Patent. Patented Mar. 26, 1912.

Application filed October 26, 1911. Serial No. 656,943.

*To all whom it may concern:*

Be it known that I, LEVIN V. ROSSER, a citizen of the United States, residing at Tuscaloosa, in the county of Tuscaloosa and State of Alabama, have invented certain new and useful Improvements in Poison-Distributing Apparatus; and I do hereby declare the following to be a full, clear, and exact description of the invention, such as will enable others skilled in the art to which it appertains to make and use the same.

The present invention relates to poison distributing apparatus, and especially to apparatus of that character for use in connection with cotton agriculture, and has for its purpose to provide a vehicle designed to travel along the rows of cotton plants and automatically distribute the poisonous material for killing caterpillars, or other vermin, destructive of the cotton plant.

The invention has for its further purpose to provide a vehicle and distributing apparatus so constructed that it may be readily taken apart for shipment and assembled for use by unskilled labor; one wherein the distributing apparatus itself may be readily adjustable to suit varying conditions in use; and which is simple in arrangement and construction and cheap to manufacture.

With these and other objects in view the invention consists in the novel details of construction and combinations of parts more fully hereinafter disclosed and particularly pointed out in the claims.

Figure 1:
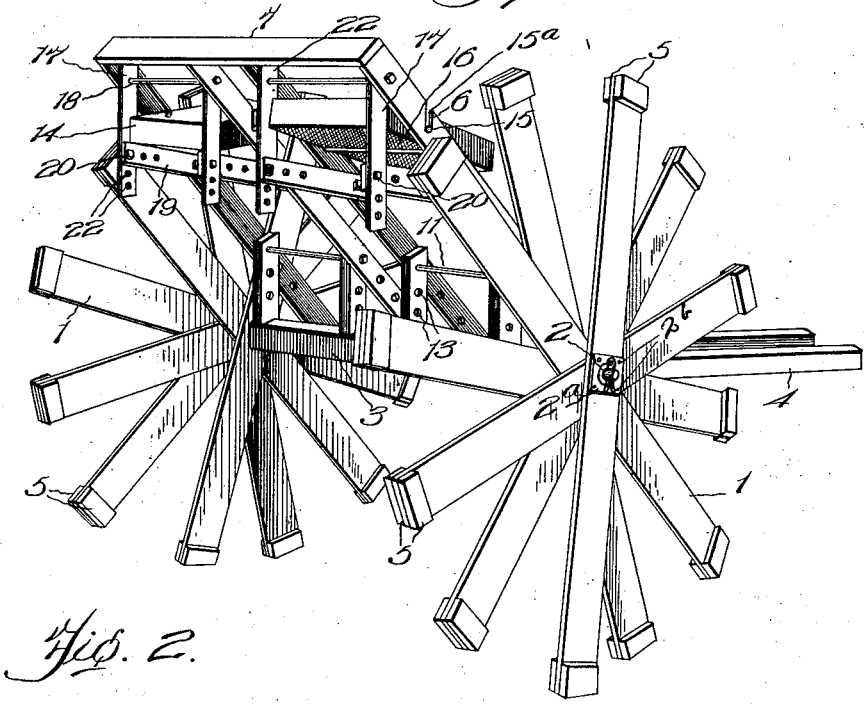
Figure 2:
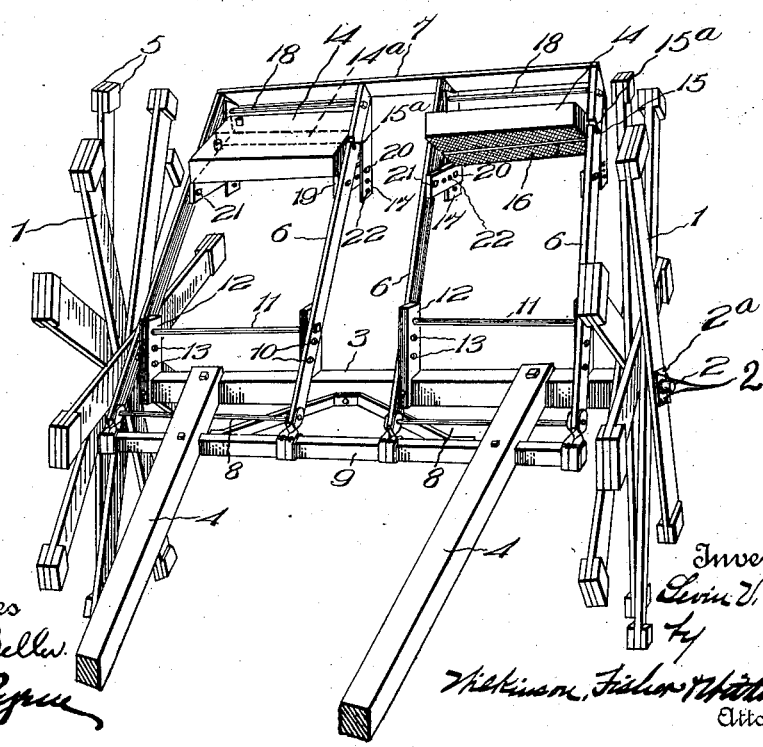

Referring to the accompanying drawings forming a part of this specification in which like numerals designate like parts in all the views:—Figure 1 is a perspective view of the apparatus complete taken from the rear, and Fig. 2 is a like view taken from the front.

Referring to the construction in detail the supporting and carrying vehicle comprises a pair of rimless wheels 1, mounted upon the spindles 2 of an axle 3, as in the ordinary manner; and shafts 4 for a horse are secured to said axle 3. In the arrangement here proposed the vehicle is not provided with a seat for the driver, since he rides the horse so as to be removed from the fumes of the powdered poison, as will be understood.

Each of the wheels 1 comprises a plurality of spokes constructed preferably of slats which extend the full diameter of the wheel, and the several slats being united by a plate 2$^a$ on either side to provide a hub. The hub plates 2$^a$ are secured to the spokes by bolts 2$^b$ which readily permit of the wheel being taken apart. Each of the spokes is provided at the ends thereof with a pair of blocks 5 secured to opposite sides in any approved manner. The employment of the blocks 5 provide what may be termed feet for the several spokes, the purpose whereof being to prevent the spokes entering the ground and to cause a jarring action to the vehicle as it travels. This jarring action is utilized to vibrate the poison carriers to distribute the poison, as will be presently explained.

The poison carrying or holding mechanism consists in a pair of rectangular frames constructed of side members 6, an end member 7, and pivotally secured on axles 8 that are carried by a cross piece 9 on the shafts 4. The cross piece 9 is bolted to said shafts and disposed parallel to the axle 3 in substantially the manner shown in Fig. 2.

The frames 6 are designed to be vertically adjustable whereby to raise or lower the poison distributers proper in accordance with the height of the cotton plants, and to this end the side members 6 of each frame are provided with a plurality of apertures 10 adapted to receive a rod 11, that is mounted in a pair of uprights 12. The uprights 12 are fixedly mounted on the axle 3 and are themselves provided each with a series of vertically arranged apertures 13 for different adjustments of the rod 11.

The poison distributers proper consist of a pair of trays or boxes 14 each having a partition piece 14$^a$ (shown in dotted lines in Fig. 2) to provide two separated compartments. A supporting rod 15, on which the box is balanced to rock, passes through the sides of each box and has the ends thereof mounted in the slots 15$^a$ in the sides 6 of the frame. Each slot 15$^a$ is open at the top whereby the rods 15 and the trays may be readily taken out, as will be understood. The bottom 16 of each box 14 consists of bolting cloth or screen of fine mesh, which is designed to sift the powdered poison over the top of the cotton plants as the vehicle travels.

A vehicle constructed as above described and having the carrying trays thereof removably mounted may very readily be taken apart for the purpose of transporting the apparatus over any great distance.

It is proposed that the powdered poison be sifted through the bottoms 16 of the receptacles by causing said receptacles to be shaken or vibrated, and this is accomplished by the jarring of the vehicle incident to the rotation of the rimless wheels. This vibration is further augmented by having the receptacles 14 suddenly interrupted during their rocking movements, and to effect which a pair of strikers are arranged for each receptacle. Said strikers comprise arms 17 dependingly mounted on rods 18 that are secured within the frame sections 6. A cross arm 19 is secured to each of the depending arms 17 by means of a bolt 20 passing through the apertures in said arms at the point of crossing. The arms 19 are pivoted at one end 21 to the side bars 6 whereby said arms may be slightly raised or lowered for adjustment, such adjustment being effected through a series of apertures 22 in each of the arms 17 and 19. Through the medium of the adjustment afforded between the members 17 and 19, the arms 19 may be adjusted horizontally with respect to the receptacles 14 accordingly as the supporting frames (6 and 7) are raised or lowered.

In operation the vehicle is drawn along the rows of cotton plants with the receptacles 14 located to distribute the poisonous powder directly from overhead, and through the jarring of the vehicle, due to the rimless wheels, the receptacles are caused to rock upon their supporting rods and such rocking is constantly interrupted by the receptacles coming into contact with the cross arms 19, which in turn causes the powder to be sifted through the bottoms 16 and delivered in the form of finely divided dust on to the cotton plants.

It is obvious that those skilled in the art may vary the details of construction and arrangement of parts without departing from the spirit of my invention, and therefore I do not wish to be limited to such features except as may be required by the claims.

What I claim is:—

1. In a poison distributing apparatus the combination of a vehicle having rimless wheels; frames swingingly mounted on the vehicle; means for holding said frames in different adjusted positions; poison holding receptacles balanced to rock on said frames through the travel of the vehicle; and arms on the frames mounted to be adjusted parallel with said receptacles for engaging with and jarring the rocking receptacles, substantially as described.

2. In a poison distributing apparatus the combination of a vehicle having rimless wheels; frames swingingly mounted on the vehicle; poison holding receptacles balanced to rock on said frames, said receptacles having sifting bottoms; arms dependingly mounted on said frames adjacent the receptacles; and cross arms adjustably secured to said depending arms and said frames and adapted to be engaged by and jar the rocking receptacles, substantially as described.

3. In a poison distributing apparatus the combination of a vehicle; frames swingingly mounted on the vehicle; means for holding said frames in different adjusted positions; poison holding receptacles balanced to rock on said frames through the travel of the vehicle; and arms on the frames mounted to be adjusted parallel with said receptacles for engaging with and jarring the rocking receptacles, substantially as described.

In testimony whereof, I affix my signature, in presence of two witnesses.

LEVIN V. ROSSER.

Witnesses:
E. H. Phifer,
C. O. Hayslett.

---

Copies of this patent may be obtained for five cents each, by addressing the "Commissioner of Patents, Washington, D. C."